Oct. 26, 1926.
G. SHAND
1,604,790
DRIFTING VALVE FOR LOCOMOTIVES
Filed Feb. 11, 1926
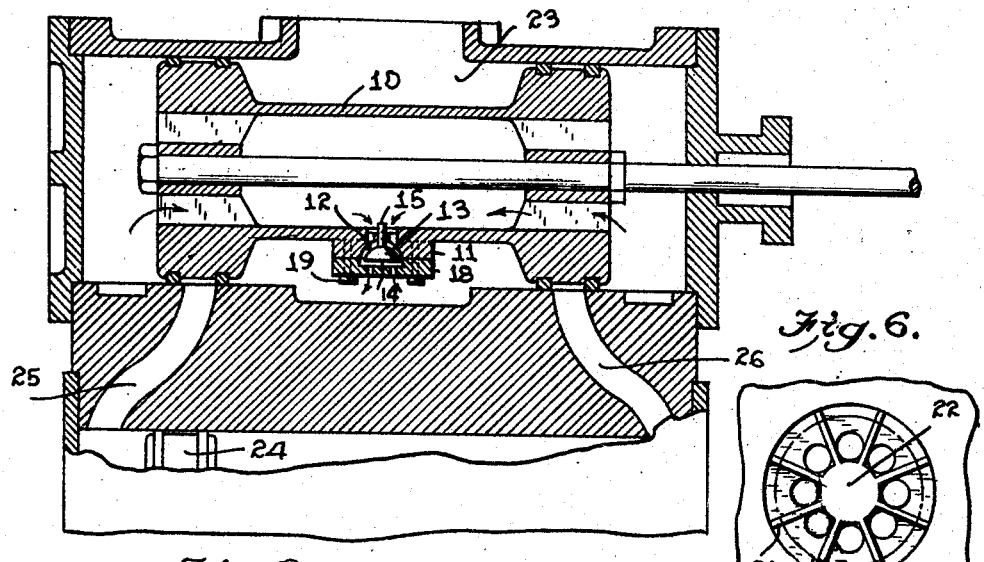
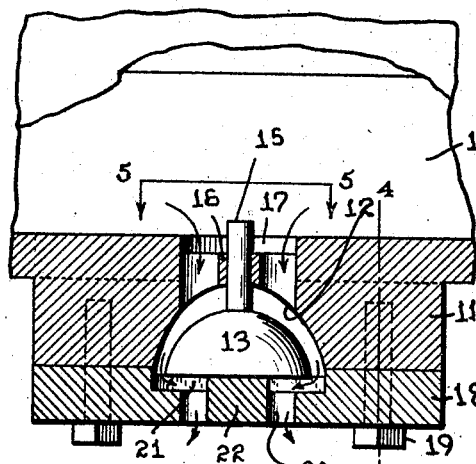
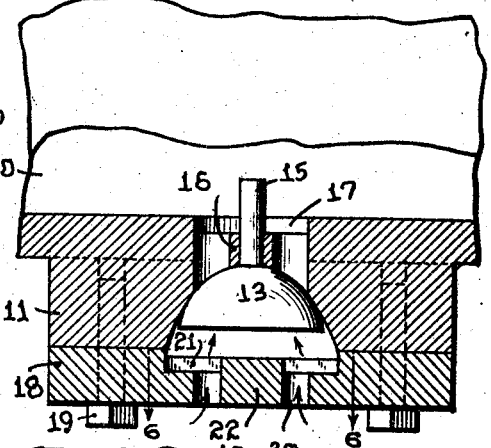
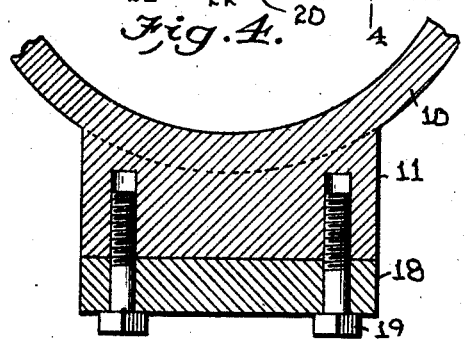
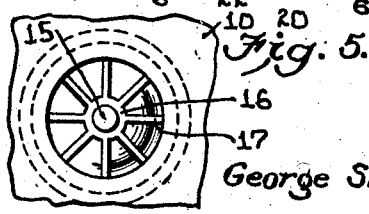
Inventor
George Shand Patented Oct. 26, 1926.

1,604,790

UNITED STATES PATENT OFFICE.

GEORGE SHAND, OF ST. JAMES, MINNESOTA.

DRIFTING VALVE FOR LOCOMOTIVES.

Application filed February 11, 1926. Serial No. 87,577.

The purpose of the invention is to provide a simple, efficient and inexpensive means for balancing the reciprocating parts of a locomotive engine while drifting by reducing to a minimum the vacuum in the steam chest ordinarily resulting from the suction of the piston; and to make such means a self-contained part of the piston valve so that there will be no outside connections and therefore no reduction in temperature of the cylinders, thus reducing condensation and making unnecessary the use of relief valves with the consequent likelihood of grit and sand being drawn into the piston valves and cylinders.

With this purpose in view, the invention consists in a construction and combination of parts of which a preferred embodiment is illustrated in the accompanying drawings, wherein:

Figure 1 is a central longitudinal sectional view illustrating the cylinder and piston of a locomotive and the cylinder valve therefor, the invention being shown applied in operative position.

Figure 2 is a transverse vertical sectional view taken axially through the by-pass valve comprising the invention, the valve being shown in open position.

Figure 3 is a view similar to Figure 2 but with the valve shown in closed position.

Figures 4 and 5 are respectively detail sectional views on the planes indicated by the lines 4—4 and 5—5 of Figure 2.

Figure 6 is a detail sectional view on the plane indicated by the line 6—6 of Figure 3.

The invention is designed for use in connection with the conventional form of piston valve 10 of which the spool is hollow as in the usual practice. The invention consists of a by-pass valve carried by the spool and disposed substantially at the longitudinal center of the latter, the body portion 11 of the valve being cast integral with the spool and hollowed out, as at 12, to provide a hemispherical seat for the valve 13 which is of hemispherical form, the under face 14 of the valve being flat. Disposed radially of and projecting from the hemispherical face of the valve is a pilot 15 formed integral with the valve, this pilot passing through a central guide eye 16 of a spider 17, the latter being carried by the wall of the piston valve spool and the openings between its arms providing for communication between the interior of the spool and the exterior thereof when the valve 13 is unseated.

Limited movement of the valve 13 toward and away from its seat is provided by means of a cage plate 18 secured to the body 11 by means of cap screws 19, the cage plate having a circular series of apertures 20 opening onto the under face of the cage plate and also onto the inner face with their upper ends disposed below the plane of the upper face of the cage plate, radial ribs 21 extending between adjacent apertures from the core or central portion 22 to the periphery of the hollowed out portion 12. Thus, when the valve 13 is in the lowered position, as indicated in Figure 2, communication between the steam chest 23 and the interior of the spool of the piston valve 10 is provided through the apertures 20, the spaces between the ribs 21, the intervening space between the valve 13 and its seat 12, and the spaces between the arms of the spider 17. When the valve 13 is closed, it engages its seat 12 and thus communication with the interior of the spool is cut off.

When the throttle valve of the locomotive is opened, there is steam present in the steam chest 23 and it may reach the valve 13 through the apertures 20. The pressure will, therefore, be sufficient to elevate the valve into engagement with its seat 12. The locomotive will then operate in the usual way. When drifting, however, the throttle valve will be closed and therefore the steam will be cut off from the steam chest 23. If the piston 24 is beginning the backward stroke, the port 25 will be the exhaust port and port 26 will be open to the steam chest 23. The valve 13 not being subject to the pressure in the steam chest will fall by gravity onto the cage plate 18 and communication between the interior of the piston valve spool and the steam chest will be effected. Thus, the vacuum that would ordinarily result in the steam chest in the backward movement of the piston 24 will be overcome by the exhaust from the rear end of the cylinder through the port 26, through the by-pass valve, and piston valve spool. In the reverse movement of the piston 18, the reverse of this cycle of operations will take place, and the steam chest will not be subject to the creation of a vacuum therein by reason of the fact that both ends of the cylinder in which the piston 24 moves will be in communication.

By adjusting the travel of the piston valve by the reverse lever, a position can be found on the quadrant to balance the vacuum and exhaust and at the same time leave sufficient cushion at the end of the piston stroke to keep the reciprocating parts of the locomotive from jerking or pounding at any speed, while drifting.

All circulating oil fed to the cylinders is circulated and returned when this invention is employed, thus insuring thorough lubrication of valves and cylinders while drifting.

As there are no outside connections of any kind for steam passage, condensation is obviously reduced to a minimum.

The invention having been described, what is claimed as new and useful is:

1. In combination with a locomotive piston valve, a by-pass valve controlling communication between the interior and exterior of said piston valve and subject to pressure in the steam chest to hold it in closed position, said valve being gravitally actuated for movement to open position.

2. In combination with a locomotive piston valve of which the spool is hollow, a by-pass valve having a body cast integral with the spool and provided with a hemispherical seat in communication with the interior of the spool, a hemispherical valve mounted for movement toward and away from said seat, and a cage plate detachably secured to said body portion.

3. In combination with a locomotive piston valve of which the spool is hollow, a by-pass valve having a body cast integral with the spool and provided with a hemispherical seat in communication with the interior of the spool, a hemispherical valve mounted for movement toward and away from said seat, a cage plate detachably secured to said body portion, the cage plate being formed with a series of apertures directly below said valve and the latter having a flat under face, and a spider carried by the piston valve spool and provided with a guide eye, said hemispherical valve having a pilot slidably engaging said guide eye.

In testimony whereof he affixes his signature.

GEORGE SHAND.